United States Patent [19]

Flanigan et al.

[11] Patent Number: 5,107,874
[45] Date of Patent: Apr. 28, 1992

[54] APPARATUS FOR CLEANING PARTICULATE SOLIDS

[75] Inventors: David A. Flanigan, Cleveland, Okla.; Robert E. Williams, Houston, Tex.

[73] Assignee: Conoco Inc., Ponca City, Okla.

[21] Appl. No.: 751,917

[22] Filed: Aug. 29, 1991

Related U.S. Application Data

[62] Division of Ser. No. 487,350, Feb. 28, 1990.

[51] Int. Cl.$^5$ .............................................. E21B 21/06
[52] U.S. Cl. ........................................ 134/60; 134/61; 134/105; 134/109; 175/206; 210/181; 210/511; 210/512.2
[58] Field of Search .................. 175/66, 206; 423/340, 423/131; 208/428; 134/26, 40, 2, 25.1, 60, 61, 105, 109; 210/768, 781, 787, 167, 180, 181, 511, 512.2

[56] References Cited

U.S. PATENT DOCUMENTS

| | | |
|---|---|---|
| 2,266,586 | 12/1941 | Branum . |
| 2,886,287 | 5/1959 | Croley ............................. 175/206 |
| 2,965,522 | 12/1960 | Crespin et al. . |
| 3,658,015 | 4/1972 | Griffin et al. . |
| 3,688,781 | 9/1972 | Talley ............................ 134/56 R |
| 3,693,733 | 9/1972 | Teague ............................ 175/66 |
| 3,693,951 | 9/1972 | Lawhon et al. . |
| 3,716,480 | 2/1973 | Finley et al. . |
| 3,860,019 | 1/1975 | Teague ............................ 134/109 |
| 4,040,866 | 8/1977 | Mondshine .................... 175/66 X |
| 4,139,462 | 2/1979 | Sample ........................ 175/66 X |
| 4,175,039 | 11/1979 | Fisher ......................... 175/66 X |
| 4,209,381 | 6/1980 | Kelly ............................ 175/66 X |
| 4,288,329 | 9/1981 | Duval ........................... 210/772 |
| 4,304,609 | 12/1981 | Morris ............................ 134/19 |
| 4,395,338 | 7/1983 | Rowton ........................ 210/180 X |
| 4,406,796 | 9/1983 | Duval . |
| 4,411,074 | 10/1983 | Daly ............................ 175/66 X |
| 4,434,028 | 2/1984 | Eppig et al. . |
| 4,434,061 | 2/1984 | McDowell ...................... 210/787 |
| 4,546,783 | 10/1985 | Lott ............................. 139/109 |
| 4,595,422 | 6/1986 | Hill et al. ....................... 134/19 |
| 4,606,283 | 8/1986 | Des Ormeaux et al. . |
| 4,606,774 | 8/1986 | Morris ........................... 134/10 |
| 4,645,608 | 2/1987 | Rayborn ....................... 175/66 X |
| 4,662,948 | 5/1987 | Weitzman ..................... 134/25.1 |
| 4,678,558 | 7/1987 | Belluteau et al. ............... 208/390 |
| 4,683,963 | 8/1987 | Skinner ........................... 175/66 |
| 4,726,301 | 2/1988 | Des Ormeaux et al. . |
| 4,812,225 | 3/1989 | Corti et al. ................... 210/787 X |
| 4,836,302 | 6/1989 | Heilhecker et al. ............... 175/66 |
| 4,906,388 | 3/1990 | Cain et al. ..................... 210/771 |
| 5,006,239 | 4/1991 | Mishra ........................... 210/181 |

FOREIGN PATENT DOCUMENTS

0005273 5/1979 European Pat. Off. .
WO8201737 5/1982 PCT Int'l Appl. .

OTHER PUBLICATIONS

Oil and Gas Journal, Aug. 14, 1972, pp. 73–76, "Cuttings Can Meet Offshore Environment Specifications".

Primary Examiner—Philip R. Coe
Attorney, Agent, or Firm—Ronald J. Carlson

[57] ABSTRACT

A system for cleaning solids contaminated with solvent-soluble contaminants. The system comprises the use of at least two successive cleaning zones, each of which includes a slurry stage and a centrifuge separation stage, wherein the solids to be cleaned and the solvent used for cleaning flow in countercurrent relationship to each other between the successive zones.

14 Claims, 3 Drawing Sheets

APPARATUS FOR CLEANING PARTICULATE SOLIDS

This is a division, of application Ser. No. 07/487,350 filed Feb. 28, 1990, pending.

FIELD OF INVENTION

This invention relates to the removal of solvent soluble contaminants from particulate solids. More particularly, the invention relates to a process and apparatus for removing or cleaning organic and inorganic contaminants from particulate solids and has particular application to removing and cleaning oil from oil-contaminated drill cutting solids resulting from oil and gas well drilling operations.

BACKGROUND OF THE INVENTION

In general, a variety of techniques have been used in the past to remove contaminants from particulate solids. For example, U.S. Pat. No. 2,965,522 describes a technique for regenerating fouled filter aids by water washing to remove the foulants. The technique involves passing the fouled filter aid through a series of hydrocyclones with separate water streams being introduced to each hydrocyclone to wash the filter aid U.S. Pat. No. 4,288,329 and U.S. Pat. No. 4,406,796 describe a technique for cleaning mill scale with solvents to remove oil and water. With increasing emphasis on environmental concerns, techniques have been developed to remove contaminants from soil as exemplified in U.S. Pat. No. 4,606,774 and U.S. Pat. No. 4,662,948.

Particular concerns with removal of contaminants from particulate solids have arisen in the drilling of oil and gas wells wherein drill cuttings generated during drilling operations are flushed from the wellbore by drilling fluids (sometimes referred to as "drilling muds"). A serious problem exists with disposal of these drill cuttings and other residual solids after separation from the drilling mud because of oil contamination. After being separated from the drilling mud, these solids have oil on their surfaces and sometimes within their porous structure. This is particularly true when an oil-based drilling mud is employed although formation oil may also be present regardless of the type of drilling mud used. Because of the increasing environmental concerns, it is essential to have economic means to clean these oil-contaminated drill cutting solids and enable disposal in an environmentally acceptable manner. This is very significant in offshore operations where it is desirable to be able to discharge the solids overboard from the drilling rigs and avoid having to transport them to shore for disposal.

With respect to drill cuttings, a variety of techniques have been suggested for dealing with this problem.

For example, the use of surfactant solutions to wash drill cuttings to remove oil and other contamination has been suggested in U.S. Pat. Nos. 3,688,781, 3,693,733, 3,716,480, 3,860,019, 4,175,039, 4,546,783, 4,595,422 and 4,645,608. These approaches attempt to wash adsorbed oil-based mud from the surface of the drill cuttings and have been largely unsuccessful because oil-based muds are specially formulated with powerful oil wetting agents that resist the detergent action of aqueous wash solutions. Additionally, detergent-laden water, which may be even more toxic to marine organisms than the oil on the drill solids, is continuously discharged into the marine environment.

Steam stripping of the cuttings to remove oil contamination has been suggested in U.S. Pat. No. 4,209,381. In these techniques, steam is used to strip the more volatile oils from oily drill cuttings followed in some cases by distillation of the remaining solids to remove the higher boiling oil fractions. The methods are particularly impractical offshore because of the excessively high energy requirements to generate the quantity of steam needed and the high temperatures needed to distill the oil.

Other thermal methods involving heating of the cuttings to volatilize or incinerate the oil contamination have been suggested in U.S. Pat. Nos. 3,693,951, 4,139,462, 4,304,609, 4,411,074, 4,606,283, 4,683,963, 4,726,301 and EP Publication Application No. 0005273. Typically, the high temperatures required for these processes is supplied by electrical resistance heating, electrical induction heating, infra-red heaters, or high temperature heat transfer fluids. The methods have been at least partly unsuccessful for reasons already cited. The total amount of energy to heat all of the solids and boil all of the liquids off the cuttings is excessively high. Also, it is very dangerous to operate any equipment offshore in which hydrocarbon vapors are generated at temperatures well above their flash point.

Solvent washing or extraction techniques to remove oil contamination from cuttings have been suggested in U.S. Pat. Nos. 4,040,866, 4,434,028, 4,836,302 and PCT Published Application No. WO82/01737.

In particular, U.S. Pat. No. 4,040,866 teaches the use of a mutual solvent to clean oily drill cuttings. A mutual solvent is one that is soluble in both oil and water. In this process, oily liquid is removed from the solids with a mutual solvent like ethylene glycol monobutyl ether; however, the mutual solvent and oil mixture remains on the cuttings and must be washed away with water followed by centrifuging to recover the cuttings. This method has proven impractical because two undesirable process streams are created. Large quantities of solvent (approximately equal to the original volume of oily liquid on the solids) are washed from the solids with water and discharged with the water into the environment. It is probable that the solvent is even more toxic to marine organisms than the oil which was removed from the cuttings. Additionally, large volumes of mutual solvent become contaminated with dissolved oil and must be either discarded or purified and recycled. The cost of mutual solvents prohibits simple disposal. Further, the high boiling point and high latent heat of vaporization of mutual solvents make their separation from oil by distillation difficult, expensive and hazardous.

U.S. Pat. No. 4,434,028 teaches a high pressure process for the use of a solvent which is miscible with oil but essentially immiscible with water to clean oily drill cuttings. In this process, a substance that is typically a gas at ambient temperature and pressure is compressed sufficiently to convert the gas to a liquid which then becomes a suitable solvent for the oil associated with drill cuttings. The liquified gas is then flowed, batchwise, through a vessel packed with oily solids. When the solids have been washed sufficiently clean, the chamber is depressurized allowing the solvent to flash into a vapor, leaving the solids free of oil and solvent. The oil-contaminated solvent can also be flashed to a vapor to separate it from the oil and allow it to be recycled. This process has not been successful on offshore drill sites for several possible reasons. High pressure is required to convert the normally gaseous material to a liquid so it can dissolve the oil on the solids. Mechanical problems associated with moving solids repeatedly into and out of high pressure vessels without leakage are formidable. Also, the batchwise nature of the process is not compatible with the continuous process of drilling and generation of drill cuttings. Finally, mechanical crushing of the cuttings prior to extraction requires heavy, bulky, maintenance-prone equipment which is especially undesirable for uses in offshore drilling operations.

U.S Pat. No. 4,836,302 teaches a system for cleaning drill cuttings using a cleaning column. The system is stated to overcome many of the problems associated with the techniques described above and is contained so as to minimize solvent escaping to the atmosphere. However, the use of a cleaning column to process all the cuttings presents certain material handling problems with respect to the very fine particles of cuttings which may constitute a significant portion of the overall cuttings.

PCT Published Application No. WO82/01737 describes a technique for reducing oil contamination on drill cuttings which involves washing the contaminated drill cuttings, preferably after screening to remove fines and supernatant drilling mud, with a single halogenated solvent. The resulting slurry is then macerated and processed through a single continuously running decanter centrifuge to separate the cleaned solids. While the system will reduce oil contamination on drill cuttings, a substantial volume of solvent is required to achieve significant cleaning.

SUMMARY OF THE INVENTION

The present invention relates to a method comprising a unique sequence of steps for continuously removing or cleaning solvent soluble contamination from particulate solids and a corresponding apparatus. The invention has particular application to cleaning organic contamination from particulate solids such as in cleaning oil from drill cutting solids and employs solvents to dissolve and carry away contamination from the surfaces and pores of the solids.

While the present invention is described with reference to drill cutting solids, it is to be understood that the invention has wide application in cleaning contaminants from solids, e.g. cleaning various organic and inorganic contaminants from earthen materials using suitable solvents including water as well as other solvents more particularly described hereinafter.

Drill cutting solids, as this term is used herein, includes all solids that may be separated from the drilling mud returned from a wellbore during drilling operations. Although the majority of these solids comprise the actual borehole material cut from the formation, other solids materials will also usually be present including additives which are conventionally used in formulating drilling muds such as weighting agents (e.g. barite, hematite, etc.), fluid loss materials (e.g. miscellaneous fibrous materials, etc.) and other well known additives. These additives may be present in finely ground form, as is usual with weighting agents, or in larger regular or irregular forms, as may be the case with fluid loss additives. The actual borehole material contained in the solids will generally comprise a wide spectrum of sizes ranging from extremely fine particles to relatively coarse particles and the relative proportions will vary extensively with the types of formations being drilled.

Briefly described, the invention involves processing of drill cutting solids contaminated with oil and a solvent stream in countercurrent relationship to one another through a series of at least two cleaning zones each of which includes a slurrying stage and a centrifuging stage.

More particularly, in an initial cleaning zone, oil-contaminated drill cutting solids, after separation from the drilling mud, are mixed with suitable solvent to form a slurry. The solvent is provided from the centrifuging stage of the next successive or second cleaning zone. Slurrying the solids with the solvent results in a significant portion of the oil contamination on the drill cutting solids to dissolve in the solvent.

The slurry is then fed to the centrifuging stage of the initial cleaning zone and centrifuged to separate the drill cutting solids having reduced oil contamination from the solvent which now has increased dissolved oil content. The solvent containing dissolved oil contaminant that is separated by the centrifuging stage may be sent to a solvent recovery zone where the solvent can be recovered by conventional means such as fractionation in single (simple flashing) or multiple stages. Some of the oil-laden solvent may be recycled back to the slurrying stage of the initial cleaning zone as may be required to further increase the liquid content of the slurry to enhance transportability through the zone.

The drill cutting solids having reduced oil contamination that have been separated in the centrifuging stage of the initial cleaning zone are then fed to a slurrying stage of a second cleaning zone. Solvent is also fed to the slurrying stage and a slurry of the drill cutting solids and the solvent is formed. During this slurrying step further oil contamination on the solids becomes dissolved in the solvent. The solvent for this slurrying stage is either solvent freshly introduced to the process scheme if no further cleaning zones are utilized or is provided from the centrifuging stage of the next successive cleaning zone.

The slurry of drill cutting solids and solvent are then fed to the centrifuging stage of the second cleaning zone. In the centrifuging stage the drill cutting solids having even further reduced oil contamination are separated from the solvent containing dissolved oil. The solvent containing dissolved oil from this centrifuging stage is then sent to the slurrying stage of the initial cleaning zone as mentioned above although a portion may be recycled to the slurrying stage of the second cleaning zone to enhance transportability of the slurry through the zone.

The drill cutting solids separated in the centrifuging stage of the second cleaning zone may have sufficiently reduced oil contamination depending on the cleanliness desired and can be sent to a heating zone operated at temperatures sufficient to volatilize any residual solvent remaining on the solids. If additional cleaning of the drill cutting solids is desired, one or more further successive cleaning zones operating in the manner described above may be employed.

In the heating zone, the drill cutting solids are continuously conveyed through the zone while being subjected to elevated temperatures sufficient to volatilize the residual solvent. During this time, some of the water that may be contained within the pores of the solids may also be volatilized. A resulting effect of volatilization of the residual solvent and some water is to further strip residual oil that may still be present on the solids.

It is also been found that stripping of residual oil from the solids can be further enhanced by adding fresh solvent to the solids prior to introduction to the heating zone. The fresh solvent is in addition to the residual solvent which remains on the solids after centrifuging. The subsequent volatilization of both the added fresh solvent and residual solvent causes further stripping of residual oil beyond that which would otherwise occur.

The drill cutting solids recovered from the heating zone are substantially reduced of oil contamination and can be substantially free of oil contamination if suitable solvent conditions are used to maximize cleaning. The process and apparatus of the present invention can be employed to sufficiently clean the drill cutting solids so that they may be discharged to the surrounding environment and, in the case of offshore operations, disposal may be directly to the sea.

As is apparent from the foregoing description, in the context of the process scheme, the drill cutting solids flow sequentially through the process from the initial cleaning zone to the second cleaning zone and sequentially to any additional cleaning zones that may be desired to achieve the desired degree of cleaning. Conversely, the solvent used for cleaning the drill cutting solids flows sequentially from the last cleaning zone to the next to last cleaning zone and so on to the initial cleaning zone. Thus, a countercurrent relationship between the drill cutting solids and the solvent stream exists with respect to flow between the cleaning zones while a concurrent flow relationship exists within each individual cleaning zone. An advantage derived from this countercurrent flow relationship is that substantially lower volume of solvent may be used to achieve a given degree of cleaning as opposed to other process schemes which do not use such countercurrent flow relationship between the solids and the solvent. Stated another way, for a given volume of solvent, significantly improved cleaning of the solids can be achieved with the invention.

In the slurrying stage of each cleaning zone, the amount of solvent used should be sufficient to form a slurry which, including any free water present with the drill cutting solids, has at least about 50 volume percent total liquid and preferably at least about 75 volume percent total liquid for slurry transportability reasons as those skilled in the art will understand.

As indicated previously, the invention can be used in cleaning a variety of contaminated solids where the contaminant is soluble in a solvent and the solids are not soluble in the same solvent. In the case of water-soluble contaminants, water may be used as the solvent and it may be possible to eliminate the heating zone and simply recover wet solids having reduced contamination. In the case of oleaginous contaminants, such as oily hydrocarbons, suitable solvents include saturated $C_5+$ hydrocarbons, particularly pentane, cyclopentane and hexane. Saturated hydrocarbons having more than six carbon atoms may be less desirable because of increasingly higher temperature requirements required for volatilization. Halogenated hydrocarbons are also highly suitable solvents, such as methylene chloride, ethylene dichloride, perchloroethylene, chloroform, methyl chloroform, carbon tetrachloride, trichloro-trifluoroethane, 1,1-dichloro-2,2,2-trifluoroethane and 1,1-dichloro-1-fluoroethane. Azeotropic mixtures are less desirable for the process of this invention because the oil dissolved in the solvent tends to change or disrupt the azeotropic properties, thus causing operational difficulties in reclaiming the solvent for further use. Preferably, the solvent employed should be a liquid at ambient temperatures and pressures so as to permit operation at atmospheric pressure and minimize loss of solvent to the atmosphere.

When using suitable solvents to clean oleaginous contaminants from solids, it is preferable to employ a solvent which has a boiling point below the boiling point of water so as to avoid undue energy load on the heating zone caused by driving off significantly more water before volatilization of the solvent can occur when higher boiling point solvents are used.

The fresh solvent initially introduced to the process scheme of the invention, i.e. to the slurrying stage of the last cleaning zone, may be free from any dissolved contaminant or, alternatively, depending on the degree of cleaning to be accomplished, may contain some disolved contaminant. What is essential is that the solvent have the capacity to dissolve further contaminant in each cleaning zone as it flows through the process scheme. In the specific case of oil contaminant on drill cutting solids, the oil will generally be infinitely soluble in the solvent and appropriate concentration gradients must be maintained to assure adequate dissolution rates in each cleaning zone for optimal operation to achieve the desired degree of cleaning. Those skilled in the art will readily understand such optimization considerations.

DETAILED DESCRIPTION OF THE INVENTION

Figure 1:
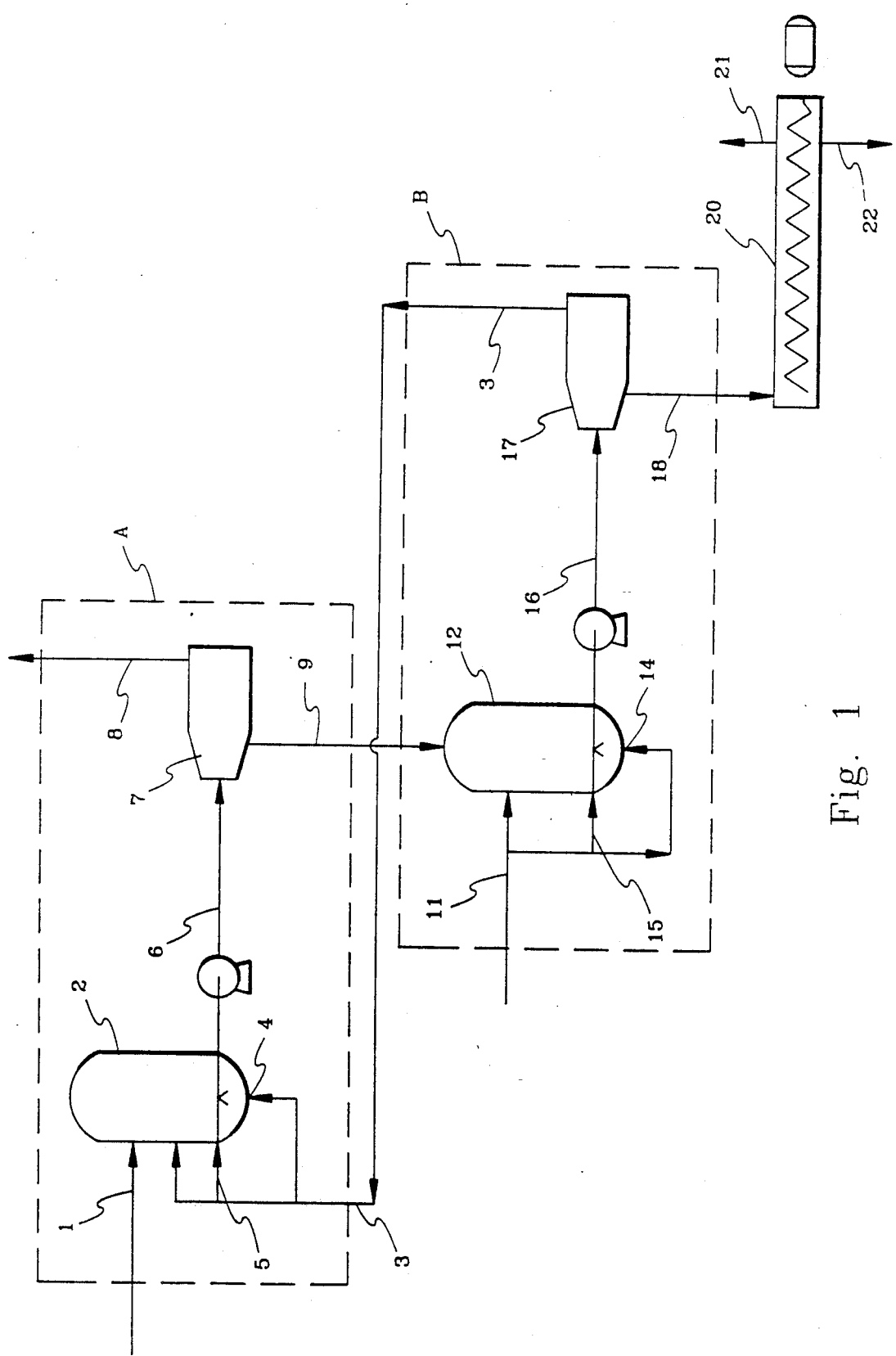
FIG. 1 is a schematic diagram illustrating the basic process and apparatus of the invention which is suitable in general for the removal of solvent soluble contaminants from particulate solids, including oil-contaminated drill cutting solids.

With reference to FIG. 1, particulate solids contaminated with solvent-soluble contaminants are introduced via line 1 to slurry tank 2 of the initial cleaning zone A. Solvent containing dissolved contaminants which has previously passed through cleaning zone B is also introduced to slurry tank 2 via line 3. In the slurry tank, contaminants on the particulate solids become dissolved in the solvent. As mentioned previously, the solvent used will depend on the nature of the contaminants to be removed. For example, a simple water system may be used when the contaminants are water-soluble materials. Organic solvents, such as light hydrocarbons and halogenated hydrocarbons, may be used when oleaginous contaminants are to be removed.

Mixing of the particulate solids and solvent in slurry tank 2 may be enhanced by conventional means as desired to assist in dissolving the contaminants. In particular, the solids which otherwise may tend to accumulate on the bottom of the slurry tank may be maintained in a somewhat fluidized condition by introducing the solvent through one or more injection ports 4 in the bottom of the tank. A further portion of the solvent may be introduced via line 5 to aid in withdrawal of the slurry from the tank through line 6. Systems that may be used to provide for fluidization and assist in withdrawal of the slurry are disclosed in U.S. Pat. No. 3,993,359 and U.S. Pat. No. 4,586,852. Other suitable systems will occur to those skilled in the art.

The slurry of particulate solids and solvent, which has now become more heavily laden with dissolved contaminants, is withdrawn from the slurry tank through line 6 and introduced to centrifuge 7 which also forms a part of cleaning zone A. While a single centrifuge is shown it should be understood that multiple centrifuges arranged to operate in parallel may be used. In the centrifuge, the solvent containing dissolved contaminants is separated from the particulate solids, now having reduced contamination, and are discharged through line 8. From line 8, the contaminated solvent may be sent to a solvent recovery system. Alternatively, depending on the solvent and the particular contaminants, it may be desired to simply incinerate the contaminated solvent. It is also possible to recycle a portion of the contaminated solvent back to slurry tank 2 to enhance transportability of the slurry through the zone.

The particulate solids having reduced contamination are discharged from centrifuge 7 through line 9 and introduced to slurry tank 12 forming a part of cleaning zone B. Clean or relatively clean solvent is also introduced to slurry tank 12 via line 11. In slurry tank 12, the particulate solids are intimately contacted by the solvent and contaminants remaining on the solids become dissolved in the solvent. Similarly as with slurry tank 2, a portion of the solvent may also be introduced through injection ports 14 for fluidization of the solids in the tank and via line 15 to assist in withdrawal of the slurry through line 16.

Through line 16, the slurry is introduced to centrifuge 17 where the solvent containing dissolved contaminants is separated from the solids and discharged via line 3 which serves to transport the contaminated solvent to slurry tank 2 of cleaning zone A. A portion of the contaminated solvent may be recycled to slurry tank 12 to enhance transportability of the solids through the zone. Again, while a single centrifuge 17 is shown, multiple centrifuges arranged to operate in parallel may be used.

The particulate solids having even further reduced contamination are discharged from centrifuge 17 through line 18 and fed to a heating zone which, for purposes of illustration, is depicted as an enclosed heated auger 20. The solids feed to the auger may be introduced entirely at the entry end thereof or at multiple locations along its length. The auger is heated by any conventional means to provide temperatures which are at least sufficient to vaporize the residual solvent present Such heating means may include heated auger internals and/or a surrounding heated jacket which utilizes circulated heated fluids or electrical resistance means.

As the solids continuously move through the heating zone, any residual solvent is volatilized and serves to further strip contaminants which may not have been dissolved and removed through earlier solvent treatment. The volatilized solvent together with stripped contaminants are removed from the heating zone through line 21. The contaminated solvent may be condensed and combined with the solvent discharged from centrifuge 17 in cleaning zone B and fed to slurry tank 2 in cleaning zone A as part of the solvent transported in line 3. Alternatively, the solvent discharged via line 21 may be combined with the solvent discharged from centrifuge 7. The cleaned solids are discharged through line 22 for disposal.

As is apparent from FIG. 1, the contaminated particulate solids generally flow from cleaning zone A to cleaning zone B in countercurrent relationship to the flow of solvent, i.e. flow of solids through lines 1, 9 and 18 versus flow of solvent through lines 11, 3 and 8, while within each cleaning zone the solvent and solids flow in concurrent relationship, i.e. from slurry tank to centrifuge. For a given total volume of solvent, this processing scheme provides for improved reduction in contamination on the solids compared with a processing scheme where the same volume of solvent is divided and separately used for processing the solids within each zone.

It is also pointed out that while the system described in FIG. 1 utilizes two cleaning zones, the invention contemplates additional cleaning zones as long as the general countercurrent relationship between the solids flow and solvent flow between the cleaning zones as described above is maintained. Additional cleaning zones may be used to achieve greater reduction in contamination of the solids if two zones do not achieve the desired reduction in contamination.

Figure 2:
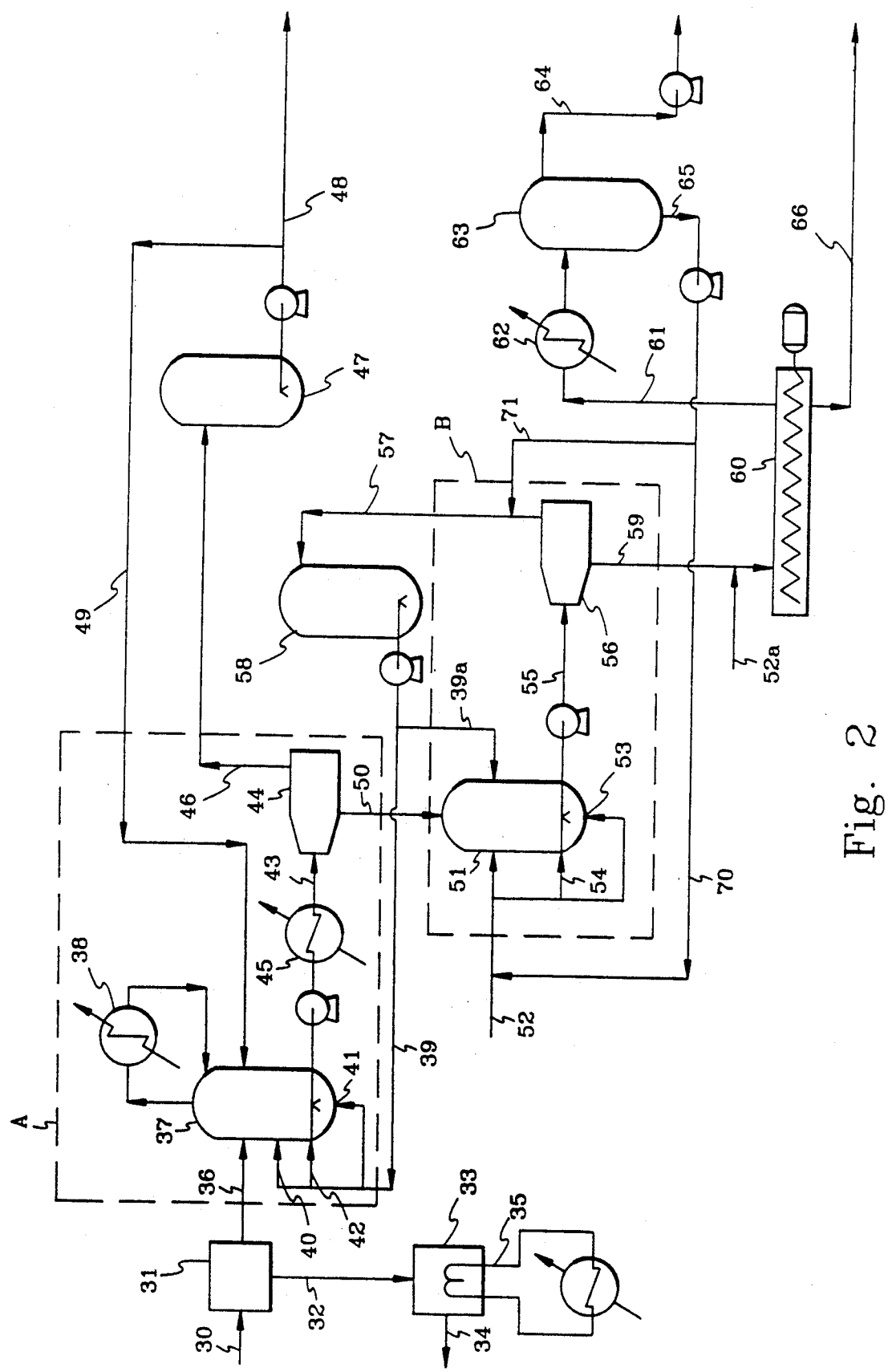
FIG. 2 is a schematic diagram illustrating a more detailed embodiment of the invention with particular application to cleaning drill cutting solids.

With reference to FIG. 2, a further embodiment of the invention is shown specifically in the context of application to cleaning drill cutting solids. As shown therein, drilling mud containing oil-contaminated drill cutting solids as obtained from a wellbore are introduced via line 30 to a solids separator 31, e.g. a shale shaker. The drilling mud from which the drill cutting solids have been removed in the solids separator is taken through line 32 to mud pit 33 for recycle to the wellbore through line 34. Since the drilling mud obtained from a wellbore will generally be at elevated temperatures due to formation temperatures and the drilling operation, the mud may be cooled before recycle such as by cooling coil 35 placed in the mud pit. Other known cooling means may also be used. Alternatively, the drilling mud containing oil-contaminated drill cutting solids in line 30 may be collected in a holding pit prior to introduction to the solids separator 31 wherein the holding pit is fitted with cooling means. This arrangement has the advantage of cooling the drill cutting solids as well as the mud and reducing volatile emissions from the solids separator.

The oil-contaminated drill cutting solids are taken from the solids separator 31 via line 36 and are introduced to slurry tank 37 forming a portion of cleaning zone A. Line 36 may be fitted with suitable cooling means to cool the drill cutting solids before entering tank 37 to reduce any tendency to volatilize the solvent if the solids are not already sufficiently cool. Alternatively, rather than cooling the drill cutting solids prior to being introduced to tank 37 the hot solids may be added directly to the tank wherein they become cooled by volatilization of the solvent. In this case, the solvent vapors can then be withdrawn and condensed by heat exchange means 38 with return of the condensed solvent to tank 37.

As a further alternative, a positive displacement pump, such as a pump commonly used to pump cement slurry, may be inserted in line 36 to move the oil-contaminated drill cutting solids from the separator 31 to the slurry tank 37 under pressure. In this manner solvent volatilization may be minimized and the potential for emissions from tank 37 is reduced without the need for heat exchange means 38.

Solvent containing dissolved oil which has been discharged from cleaning zone B is also introduced to slurry tank 37 by way of line 39 through at least side entry 40 to form a slurry.

In tank 37, the drill cutting solids mix with the solvent as they settle to the bottom of the tank thus dissolving a portion of the contaminating oil. The drill cutting solids accumulating on the bottom of tank 37 may be maintained in a fluidized condition by introducing a portion of the solvent through one or more injection ports 41 in the bottom of the tank. The slurry of drill cutting solids and solvent is then withdrawn from tank 37 through line 43. A further portion of solvent may be introduced via line 42 to aid in withdrawal of the slurry. As mentioned in connection with FIG. 1, fluidization and withdrawal of the slurry may easily be accomplished using systems such as described in U.S. Pat. No. 3,993,359 and U.S. Pat. No. 4,586,852.

The slurry of drill cutting solids and solvent are then introduced via line 43 to centrifuge 44. A heat exchanger 45 may be inserted in line 43 to cool the slurry before introduction to the centrifuge to further reduce the tendency for the solvent to vaporize. The solvent portion of the withdrawn slurry contains dissolved oil from the drill cutting solids.

Again, while a single centrifuge has been shown in FIG. 2 for purposes of illustrating the invention, a plurality of centrifuges may be employed in parallel arrangement. In any event, regardless of whether one or more centrifuges are used, the slurry is separated into a solvent stream 46 and a drill cutting solids stream 50.

The solvent stream is relatively heavily laden with dissolved oil and is fed to holding tank 47 from which it is withdrawn via line 48 and sent to a recovery system, such as flashing or multi-stage fractionation to recover clean solvent. The recovered clean solvent may be used as the solvent feed to cleaning zone B described hereinafter. The residual oil may also be reused in the drilling mud or elsewhere.

It may be desirable to recycle a portion via line 49 to slurry tank 37 of cleaning zone A to assist in transportability of the slurry through the zone by increasing the liquid volume.

In the event recovery of the solvent and removed oil is not desired, they may be incinerated for fuel value.

The drill cutting solids having substantially reduced oil content discharged from centrifuge 44 via line 50 are introduced to slurry tank 51 forming a portion of cleaning zone B. Clean or relatively clean solvent is introduced to slurry tank 51 via line 52 and intimately contact the drill cutting solids dissolving oil which has remained on the solids after cleaning zone A. A portion of the feed solvent may be diverted and introduced through injection ports 53 to provide fluidization of the solids in the lower portion of slurry tank 51 and through line 54 to assist in withdrawal of the slurry similarly as described in connection with slurry tank 37.

The slurry is withdrawn from slurry tank 51 via line 55 and introduced to centrifuge 56 also forming a part of cleaning zone B. Again, rather than a single centrifuge as shown, multiple centrifuges arranged to operate in parallel may be used. In the centrifuge, the solvent containing dissolved oil is separated from the drill cutting solids and discharged via line 57 to holding tank 58. Solvent contained in holding tank 58 serves as the feed solvent to slurry tank 37 of cleaning zone A via line 39.

Again, a portion of the solvent in line 39 may be diverted via line 39a to slurry tank 51 to increase the liquid volume of the slurry and enhance transportability of the slurry through zone B.

The drill cutting solids having even further reduced oil contamination are discharged via line 59 and are fed to an enclosed heated auger 60. The auger is heated by conventional means as described in connection with FIG. 1. As the solids are continuously conveyed through the auger, they are subjected to elevated temperatures which serve to drive off any residual solvent. To conserve energy, these temperatures should be maintained at a minimum required to volatilize the solvent. Some water may also be volatilized and driven off with the solvent. This volatilization can also serve to further strip residual oil that may not have been dissolved and removed through the earlier solvent treatment, particularly if higher than minimum temperatures are used, such as about 250° F. to 350° F. However, even when using lower temperatures, stripping of residual oil can be enhanced by adding fresh solvent via line 52a to the solids containing residual solvent and residual oil prior to introduction to the heating zone.

The volatilized materials are removed from the auger through line 61, condensed in heat exchanger 62 and fed to decant tank 63. In the decant tank, any water, which is immiscible with the solvent, separates from the solvent and is withdrawn via line 64 for further treatment and disposal. The solvent, which will contain dissolved residual oil that has been stripped from the solids, is withdrawn via line 65 and recycled to one or both of solvent lines 52 and 57 via lines 70 and 71, respectively, for reuse in the process.

Cleaned and dried drill cutting solids are discharged from the auger 60 through line 66 for disposal.

Although the system described in connection with FIG. 2 utilizes two cleaning zones, additional cleaning zones may be integrated to achieve even greater reduction in oil contamination of the drill cutting solids.

A series of comparisons of the system of the invention with other closely related systems was made. The systems compared were (I) a single cleaning zone including a slurrying stage followed by a centrifuging stage wherein drill cutting solids and solvent are processed concurrently through the zone on a single pass; (II) a combination of two cleaning zones, each including a slurrying stage followed by a centrifuging stage, wherein the drill cutting solids are processed first through the initial cleaning zone and then through the next (second) cleaning zone but the solvent is divided into two equal portions, with the first portion used in operating the first cleaning zone and the second portion used in operating the second cleaning zone on single passes; and (III) a combination of two cleaning zones, each including a slurrying stage followed by a centrifuging stage, wherein the drill cutting solids are processed first through the initial cleaning zone and then through the next (second) cleaning and the solvent is processed first through the second cleaning zone and then through the initial cleaning zone in concurrent fashion to the drill cutting solids. Each comparison is made on a basis of the same quantity and flow of oil-contaminated drill cutting solids through the systems wherein the oil contamination on the incoming drill cuttings equated to about 20 weight percent. Comparisons were made using a series of increasing volumes (flow rates) of solvent through the systems but with each comparison based on the same total volume of solvent.

Figure 3:
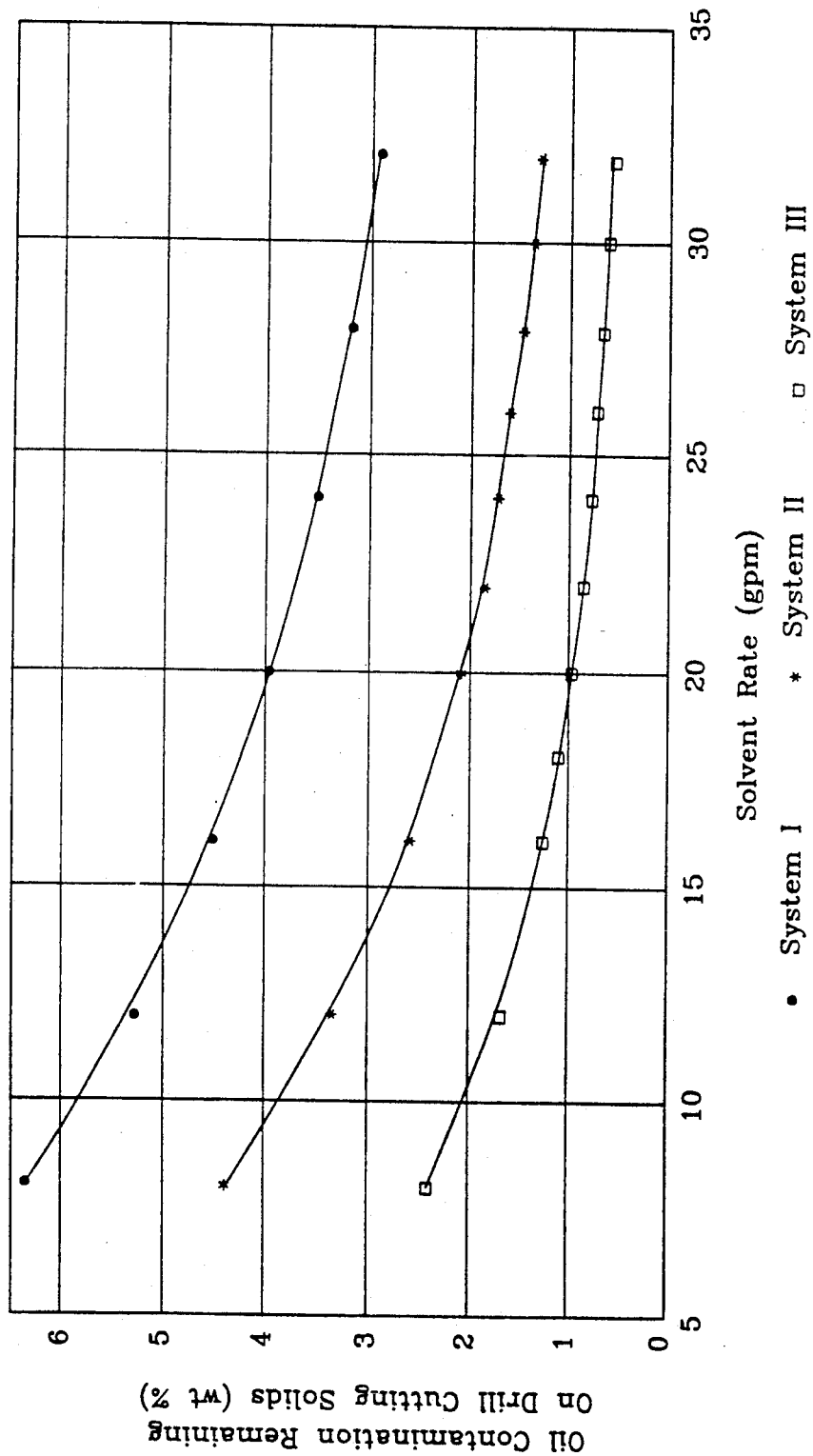
FIG. 3 graphically depicts the improved cleaning achieved with invention through a series of comparisons with closely related systems.

FIG. 3 graphically represents the results of these comparisons. As is apparent, when using a volume of solvent equal to about 8 gallons per minute, System I resulted in drill cutting solids still containing in excess of 6 weight percent oil contamination and System II resulted in drill cutting solids still containing in excess of 4 weight percent oil contamination while System III (the invention) resulted in drill cutting solids having oil contamination reduced to somewhat in excess of 2 weight percent. As the volume of solvent is increased, more of the oil contamination is removed from the drill cutting solids with each system but significantly improved oil contamination removal is consistently achieved with System III. These comparisons demonstrate that, compared to the other systems described, the invention provides an improved system for reducing oil contamination on drill cutting solids when each system uses the same amount of fresh solvent to cleanse the drill cutting solids.

The following examples demonstrate the effectiveness of the heated auger in removing solvent from the cleaned drill cutting solids while at the same time stripping residual oil from the cuttings. In each example, drill cutting solids at a temperature of about 60° F. were fed to a heated auger, conveyed therethrough while being subjected to various elevated temperatures and then discharged.

EXAMPLE 1

In this example, the drill cutting solids feed to the auger had a composition of 75.79 weight percent solids, 12.31 weight percent methylene chloride solvent, 11.46 weight percent water and 0.44 weight percent oil. At discharge, the solids were at a temperature of about 195° F. and contained about 8 ppm of residual solvent. Further analysis indicated substantially 100 percent of the oil had been stripped and water content had been reduced by about 35 percent.

EXAMPLE 2

Drill cutting solids feed to the auger had a composition of 78.88 weight percent solids, 11.35 weight percent methylene chloride solvent, 8.85 weight percent water and 0.92 weight percent oil. At discharge, the solids were at a temperature of about 131° F. and contained about 54 ppm of residual solvent. Further analysis indicated about 76 percent of the oil had been stripped and water content had been reduced by about 14 percent.

EXAMPLE 3

Drill cutting solids feed to the auger had a composition of 81.40 weight percent solids, 11.36 weight percent methylene chloride solvent, 6.49 weight percent water and 0.75 weight percent oil. At discharge, the solids were at a temperature of about 171° F. and contained about 11 ppm of residual solvent. Further analysis indicated substantially 100 percent of the oil had been stripped, however, determination of water content reduction suffered from defective analytic technique.

EXAMPLE 4

Drill cutting solids feed to the auger had a composition of 77.95 weight percent solids, 9.21 weight percent methylene chloride solvent, 10.68 weight percent water and 2.16 weight percent oil. At discharge, the solids were at a temperature of about 165° F. and contained about 40 ppm of residual solvent. Further analysis indicated about 19 percent of the oil had been stripped and water content had been reduced by about 33 percent.

EXAMPLE 5

Drill cutting solids feed to the auger had a composition of 73.19 weight percent solids, 15.69 weight percent methylene chloride solvent, 10.14 weight percent water and 0.98 weight percent oil. At discharge, the solids were at a temperature of about 160° F. and contained about 51 ppm of residual solvent. Further analysis indicated about 59 percent of the oil had been stripped and water content had been reduced by about 25 percent.

The foregoing examples demonstrate that when the drill cutting solids fed to the heated auger contain significant quantities of solvent, such as would be achieved by adding fresh solvent to the centrifuged solids, substantial quantities of residual oil are stripped from the solids during volatilization and removal of the solvent.

Thus, having described the invention in detail, it is to be understood that the foregoing description and drawings are not intended to be limiting, but only exemplary of the inventive features which are defined in the claims.

What is claimed is:

1. An apparatus for cleaning solids contaminated with a solvent-soluble contaminant which comprises:
   (a) an initial cleaning zone means comprising a slurry means for receiving and slurrying the contaminated solids with a solvent for the contaminant, a centrifuge means for receiving the slurry from the slurrying means and separating the solids having reduced contamination from the solvent containing dissolved contaminant, and means for discharging the solids having reduced contamination from the centrifuge means,
   (b) at least one successive cleaning zone means comprising a slurry means for receiving and slurrying the solids discharged from the initial or immediately preceding cleaning zone means with a solvent, a centrifuge means for receiving the slurry from the slurry means and separating the solids having further reduced contamination from the solvent containing dissolved contaminant and means for discharging the solids having further reduced contamination from the centrifuge means,
   said apparatus being further characterized in that (1) the initial cleaning zone means and each successive cleaning zone means are arranged in series with respect to one another with means being provided to supply fresh solvent to the slurry means of the last successive cleaning zone means and (2) means are provided to feed the solvent separated from the solids in the centrifuge means of the last and any preceding cleaning zone means to the slurrying means of the next preceding cleaning zone means whereby the flow of solids from cleaning zone means to cleaning zone means is in countercurrent relationship to the flow of solvent from cleaning zone means to cleaning zone means.

2. The apparatus according to claim 1 wherein there are two cleaning zone means.

3. The apparatus according to claim 1 wherein there are at least three cleaning zone means.

4. The apparatus according to claim 1 wherein at least one successive cleaning zone means comprises a plurality of sub-cleaning zone means arranged in parallel, each of which includes slurrying means and centrifuge means, and wherein means are provided to split the solids discharged from the preceding cleaning zone means into separate feeds and introduce such separate solids feeds to the slurrying means of each sub-cleaning zone means and means are provided to correspondingly split the solvent entering the cleaning zone means into separate feeds and introduce such separate solvent feeds to the slurrying means of each sub-cleaning zone means.

5. The apparatus according to claim 1 wherein heating means are provided to receive the solids discharged from the last cleaning zone means and volatilize the residual solvent.

6. The apparatus according to claim 5 wherein means are provided to introduce additional solvent to the solids discharged from the last cleaning zone means prior to the heating means.

7. The apparatus according to claim 1 wherein means are provided to fractionate the solvent containing dissolved contaminant separated from the solids in the centrifuge means of the initial cleaning zone means to recover substantially contaminant-free solvent and means are provided to recycle such contaminant-free solvent to the last cleaning zone means.

8. An apparatus for cleaning drill cutting solids contaminated with oil which comprises:
  (a) an initial cleaning zone means comprising a slurry means for receiving and slurrying the oil-contaminated drill cutting solids with a solvent for the oil contaminant, a centrifuge means for receiving the slurry from the slurrying means and separating the solids having reduced oil-contamination from the solvent containing dissolved oil contaminant, and means for discharging the solids having reduced oil-contamination from the centrifuge means,
  (b) at least one successive cleaning zone means comprising a slurry means for receiving and slurrying the solids discharged from the initial or immediately preceding cleaning zone means with a solvent for the oil contaminant, a centrifuge means for receiving the slurry from the slurry means and separating the solids having further reduced oil-contamination from the solvent containing dissolved oil contaminant and means for discharging the solids having further reduced oil-contamination from the centrifuge means.

said apparatus being further characterized in that (1) the initial cleaning zone means and each successive cleaning zone means are arranged in series with respect to one another with means being provided to supply fresh solvent to the slurry means of the last successive cleaning zone means and (2) means being provided to feed the solvent separated from the solids in the centrifuge means of the last and any preceding cleaning zone means to the slurrying means of the next preceding cleaning zone means whereby the flow of solids from cleaning zone means to cleaning zone means is in countercurrent relationship to the flow of solvent from cleaning zone means to cleaning zone means.

9. An apparatus according to claim 8 wherein means are provided to introduce the oil-contaminated drill cutting solids to the slurry means of the initial cleaning zone which include means to cool said solids.

10. An apparatus according to claim 8 wherein means are provided to recycle a portion of the solvent discharged from the centrifuge means of the initial cleaning zone to the slurry means of the initial cleaning zone.

11. An apparatus according to claim 8 wherein means are provided to recycle a portion of the solvent discharged from the centrifuge means of one or more successive cleaning zone means to the slurrying means of the corresponding cleaning zone means to enhance transportability of the slurry through such zone.

12. An apparatus according to claim 8 wherein heating means are provided to receive the drill cutting solids discharged from the last cleaning zone means and volatilize the residual solvent.

13. An apparatus according to claim 12 wherein means are provided to add additional solvent to the drill cutting solids discharged from the last cleaning zone means prior to introduction to the heating means.

14. An apparatus according to claim 12 wherein means are provided to condense the volatilized solvent and recycle and condensed solvent to the slurry means of the last cleaning zone.

* * * * *